INVENTOR
KARL HEINRICH KUHLEMANN

INVENTOR
KARL HEINRICH KUHLEMANN

Jan. 12, 1971  K. H. KUHLEMANN  3,553,780
APPARATUS FOR FORMING A SOCKET-SHAPED END ON PLASTIC PIPES
Filed April 18, 1967  5 Sheets-Sheet 5

INVENTOR
KARL HEINRICH KUHLEMANN
BY
ATTORNEYS

United States Patent Office 3,553,780
Patented Jan. 12, 1971

3,553,780
APPARATUS FOR FORMING A SOCKET-SHAPED END ON PLASTIC PIPES
Karl Heinrich Kuhlemann, Rehau, Germany, assignor to Rehau-Plastiks G.m.b.H.
Filed Apr. 18, 1967, Ser. No. 631,735
Int. Cl. B29c 17/00
U.S. Cl. 18—19                                           3 Claims

ABSTRACT OF THE DISCLOSURE

An apparatus for forming a socket on the end of a plastic pipe comprising a mold formed by a hollow outer member and a core positioned within and spaced from the outer member. The outer member is formed by two separate sections movable radially with relation to one another. The core is comprised of two pairs of separate segments. One pair of the segments is retractable axially into a hollow tubular mandrel. Situated within the mandrel is an axially movable nose key for positioning the segments in the core. A holding member feeds the pipe under pressure into the space in the mold between the core and the outer member for forming the socket and at the same time increasing the pipe wall thickness of the socket.

BACKGROUND OF THE INVENTION

The present invention is directed to an apparatus for forming a socket-shaped end on a plastic pipe, and more particularly, it is concerned with increasing the pipe wall thickness in the socket simultaneous with the formation of the socket.

The formation of a socket on a plastic pipe has been done in the past. However, there has been the disadvantage in forming such sockets, usually by forcing the pipe wall radially outward, that the wall thickness in the socket is reduced resulting in a reduction in the wall strength of the pipe in the socket. An example of the prior art is contained in British patent specification 850,562 wherein the end of the plastic pipe is preheated in a mold until the plastic state is reached. Then a pressure medium is inserted into the pipe end within the mold forcing it outwardly. In this arrangement, while forming the socket the outwardly directed pressure reduces both the wall thickness and strength of the pipe at its molded end. Another example of the prior art is shown in British patent specification 639,997, where a flange is formed of the heated end of a plastic pipe by inserting it into a mold and forcing a mandrel into the pipe. In this arrangement also the pipe thickness in the molded section is reduced and due to the reduction the pipe becomes unusable for pressure pipe lines particularly because of the stress developed in the socket portion of the pipe end.

SUMMARY OF THE INVENTION

Accordingly, in the present invention while the socket is being formed, the pipe thickness is increased rather than decreased.

Therefore, the primary object of the present invention is to provide apparatus for forming a socket on the end of a plastic pipe and, at the same time, for increasing the wall thickness of the pipe at the socket.

Another primary object of the present invention is to provide a mold formed by an outer member and a segmented core adapted to be removed from the mold.

Another object of the invention is to provide means in the body of the mold for first heating the pipe end as it is molded and then cooling the pipe end after the molding operation has been completed.

A further object of the invention is to provide a device for feeding the pipe under pressure into the mold.

Therefore in the present invention formation of the socket includes feeding the pipe end into a space in a mold between the mold body and the core and at the same time heating the pipe end. As the pipe end is forced into the mold, it follows the configuration formed by the mold and its thickness is increased under the action of the pressurized feed of the pipe. After the socket has been formed, the mold and the pipe end are cooled, the mold structure is removed from the end of the pipe and the socket forming operation is completed.

In the apparatus of the present invention, the mold is formed by a core disposed within and spaced from an outer member. The outer member is formed by two sections or cheeks which are mounted on movable means so that they can be moved toward and away from one another. Similarly, the core itself is segmented into two pairs of oppositely disposed segments, one pair of segments is mounted on separate members so that they can be moved away from one another into operating position and toward one another when the core is dismantled. The other pair of segments fits between the previously mentioned pair and is mounted in a hollow tubular mandrel which is axially movable into and out of the mold. In the mandrel an axially displaceable nose key is arranged to move the segments into position in the mold and to retract them into the mandrel. For feeding the pipe into the mold, a transport member carries the pipe axially and, by means of a hydraulic cylinder, forces the pipe into the mold wherein the socket is formed and its wall thickness increased.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE INVENTION

Figure 1:
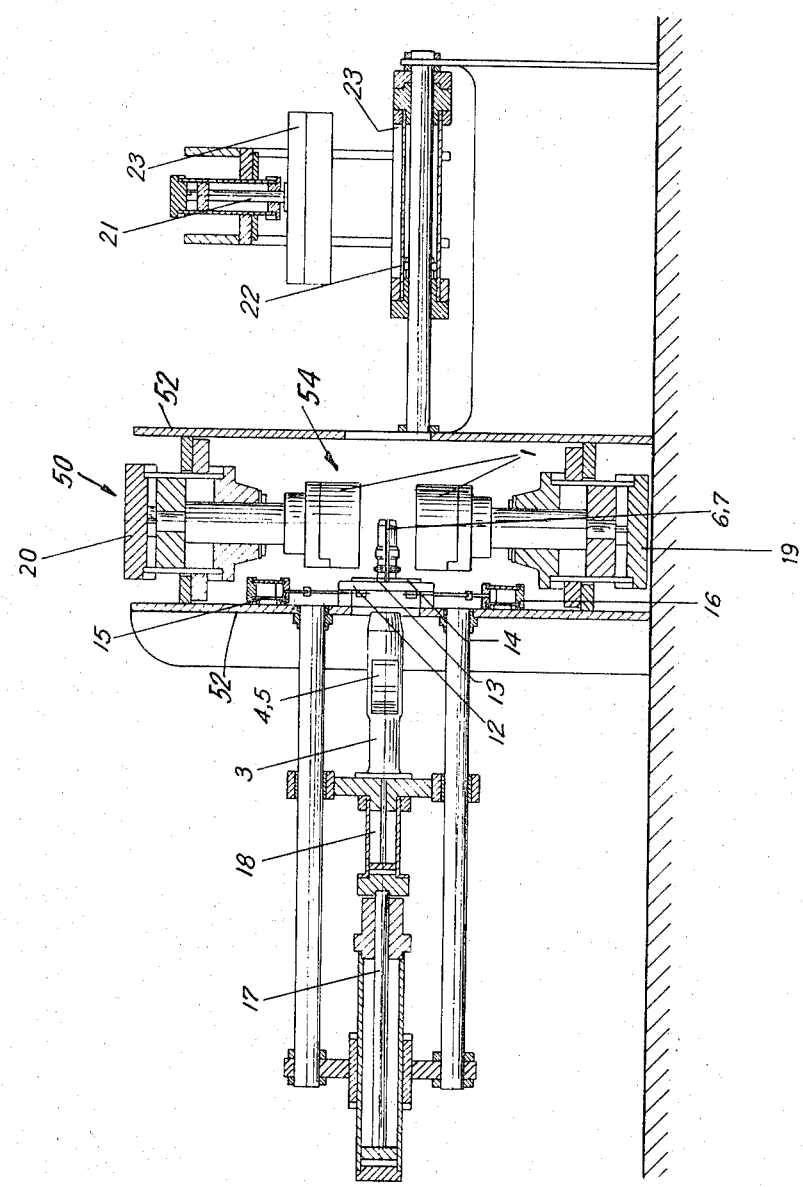
FIG. 1 is a sectional side view of a preferred embodiment of the invention showing the mold in retracted arrangement and the pipe transport system spaced from the mold.
Figure 2:
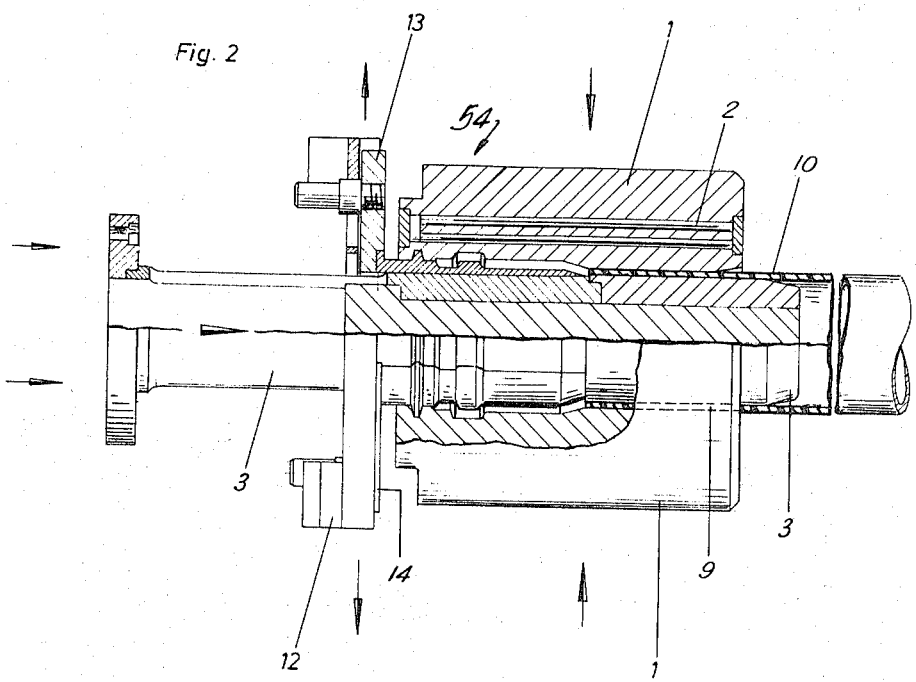
FIG. 2 is an enlarged side view, partly in section, showing the mold apparatus illustrated in FIG. 1 in an assembled position.

In FIG. 1 a molding apparatus 50 is shown having a frame comprised in part by a pair of oppositely disposed support members 52. Positioned between the members 52 is a mold 54 illustrated in retracted or disassembled arrangement. The mold, shown in assembled arrangement in FIGS. 2 and 3, comprises an outer section and an inner portion or core. The outer section of the mold is formed by a pair of oppositely disposed cheeks 1 arranged in vertical alignment, the lower cheek is supported by a cylinder 19 and the upper cheek by a cylinder 20 so that they may be moved radially toward one another into engagement to form the outer section of the core. Each of the cheeks has an inner semi-cylindrical surface shaped to form the outer surface of the pipe end within the mold. Heating and cooling members 2 extend longitudinally through the cheeks (see FIG. 2). When the cheeks are moved together into contacting relationship, they form a hollow center within which the core of the mold is positioned.

The core comprises two pairs of segments, one a pair of side segments 4 and 5, the other or second pair providing the top and bottom segments 6 and 7. In FIG. 1 the segments 4 and 5 are shown in a retracted position within a mandrel 3. In the core the segments 4 and 5 are positioned by an axially movable nose key 11, which retracts into the mandrel. The nose key 11 has a pair of tapered faces which, within the core, are in contacting relationship with the inside faces of the segments 4 and 5 and a pair of parallel disposed faces which are in contact with the inside faces of the other segments 6 and 7.

Figure 5:
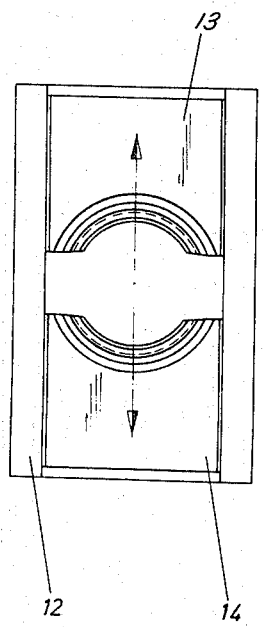
FIG. 5 is an end view of a portion of the mold core shown in assembled position.
Figure 6:
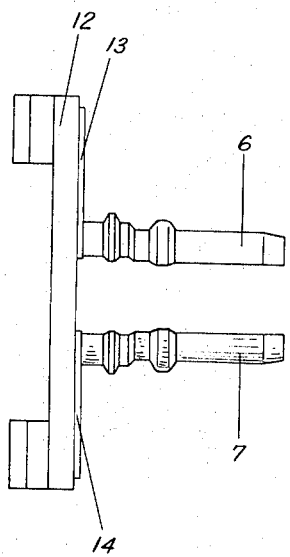
FIG. 6 is a side view of the apparatus shown in FIG. 5.
Figure 7:
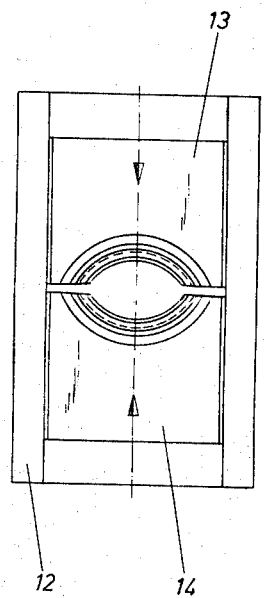
FIG. 7 is a view similar to FIG. 5 with the portion of the mold core shown in retracted position.
Figure 8:
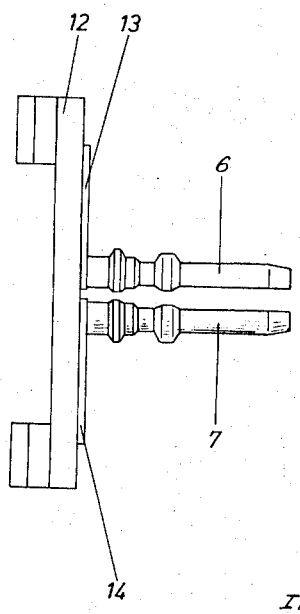
FIG. 8 is a side view of the apparatus shown in FIG. 7.
Figure 9:
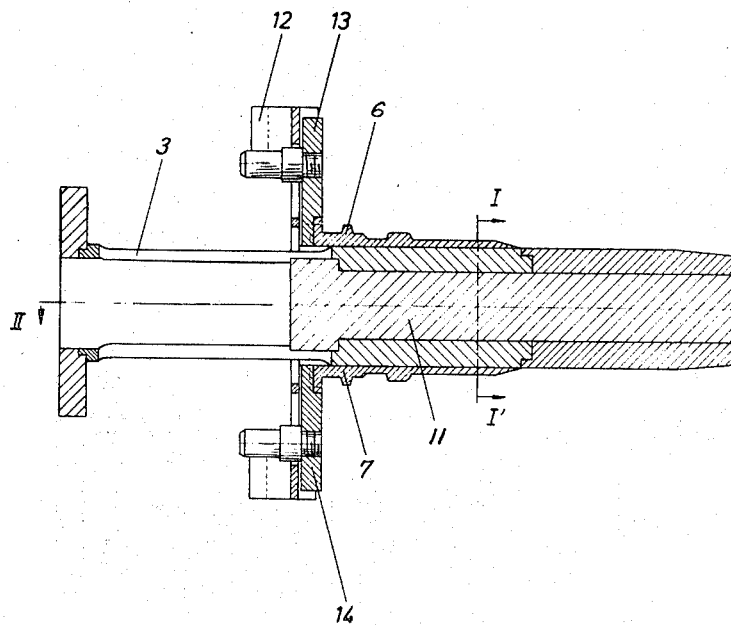
FIG. 9 is a sectional side view of the core mold as illustrated in FIG. 2.
Figure 10:
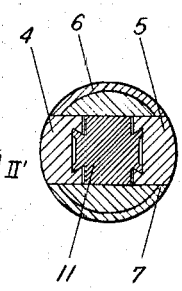
FIG. 10 is a sectional view of the core in FIG. 9, taken along the line I–I'.
Figure 11:
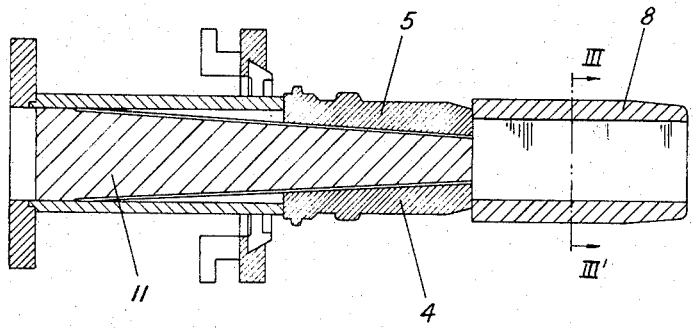
FIG. 11 is a sectional view of the core shown in FIG. 9, taken along the line II–II'.
Figure 12:
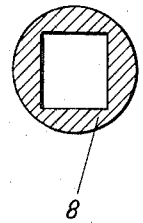
FIG. 12 is a sectional view of the core taken along line III–III' of FIG. 11.

Segments 6 and 7, disposed above and below the pair of side segments, are spaced apart, as shown in FIG. 5, when the mold is in operating condition and are disposed closely together when the core segments are retracted (see FIG. 1). Both of the segments 6 and 7 are carried on a member 12 which supports a pair of movable plates 13 and 14 to which these segments are directly attached. The plates 13 and 14 are arranged to move toward and away from one another so that the segments 6 and 7 may be located in the core operating position or in the retracted position shown in FIGS. 5 and 7, respectively.

The outer surfaces of the segments 4, 5, 6, and 7 form one continuous surface and are shaped to provide the inner configuration of the socket end of the pipe 10. A circumferentially extending protuberance on the segments registers with the groove formed in the inner surface of the cheeks and provides a grooved surface in the inner wall of the pipe.

In FIG. 1 on the opposite side of the frame support members 52 from the mandrel is a transport member 23 for holding the plastic pipe by means of a compression or holding cylinder 21. As shown the member 23 is in its open position. Also forming a part of the transport system for the pipe is a hydraulic cylinder 22 mounted below the transport member 23 which forces or drives the pipe into the space between the core and the outer member or cheeks 1 of the mold.

Figure 3:
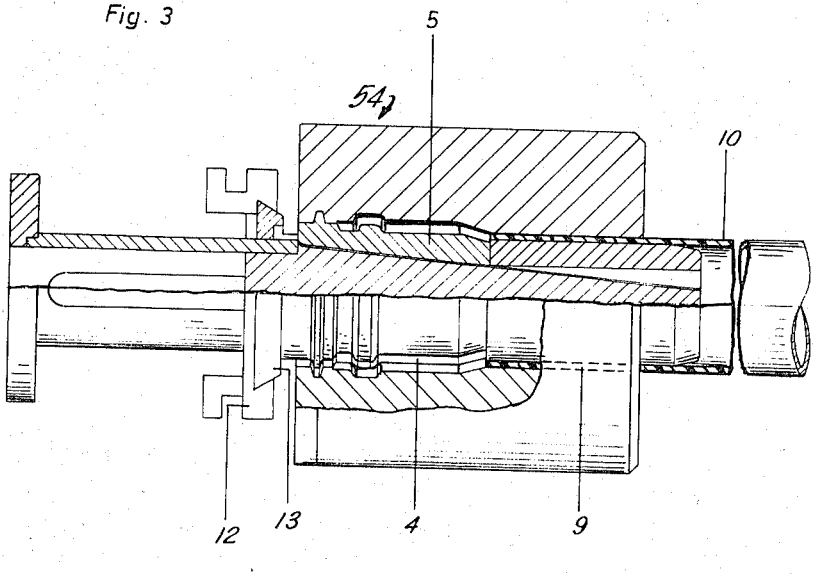
FIG. 3 is a top view, partly in section, of the mold apparatus illustrated in FIG. 2.
Figure 4:
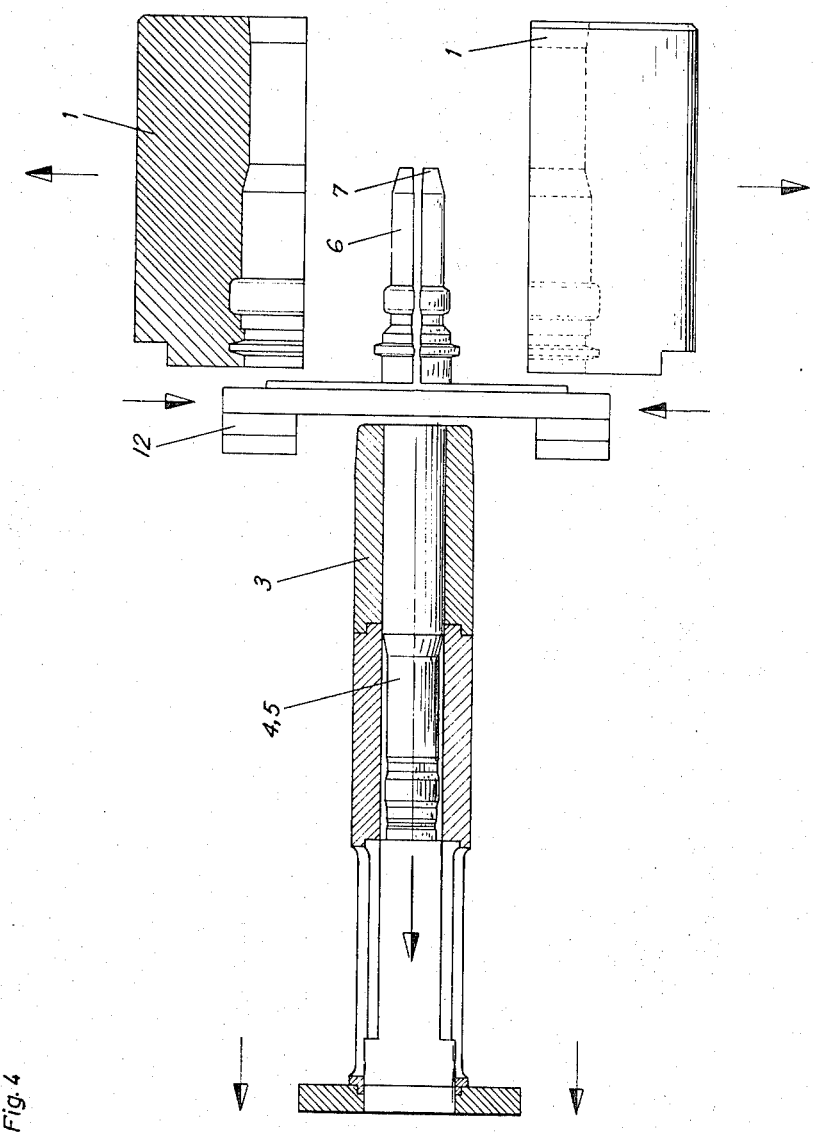
FIG. 4 is a side view, partly in section, showing a portion of the mold apparatus in retracted position.

In operating the molding apparatus 50 as shown in FIG. 1, initially the cheeks are moved into contacting position forming the outer hollow member about the core. The segments 6 and 7 are then moved outwardly away from one another so that they are in proper position for forming the top and bottom parts of the core. Next the mandrel 3 is directed axially outward by the cylinder 17 and the nose key 11 is extended axially by the cylinder 18 so that its tapered faces force the side segments 4 and 5 radially outwardly into position between the top and bottom segments 6 and 7 and forming the continuous outer surface of the core. The outer member or cheeks 1 and the core or segments 4, 5, 6, and 7 are in position as shown in FIGS. 3 and 4 and are ready for the molding operation on the end of the pipe.

The plastic pipe is held by the transport member 23 by means of the compression chamber 21 and is driven axially toward and into the mold by the cylinder 22. As its leading edge enters the mold it travels over the hollow guide member 8 and is directed into the space between the core and the outer member. The end of the pipe is heated within the mold by the members 2 located within the cheeks 1. Because the pipe is in a somewhat plastic state due to the heating operation, it is deformed as it is driven under pressure into the space between the core and the outer member and adopts the contour of the space providing a groove near its outer end. In addition, due to the pressure applied by the chamber 22, the wall of the pipe within the mold is increased in thickness so that the strength of the pipe at the socket retains the same value as that of the remainder of the pipe.

Accordingly, the following formula provides a simple method for calculating the amount the wall thickness of the pipe end has to be increased to maintain its relative strength condition with the remainder of the pipe:

$$S = \frac{d \times p}{2 \times \sigma + p}$$

whereby:
$S$ = wall thickness
$d$ = outside dia. of the pipe
$p$ = pressure (gage pressure in atmospheres)
$\sigma$ = permissible stress.

After the socket has been molded on the end of the pipe the members 2 for cooling the pipe are placed in operation to insure the dimensional stability of the molded socket. After the cooling has been completed, the cheeks 1 are separated from one another by means of the cylinders 19 and 20, exposing the exterior of the pipe. Next the mandrel 3 and the nose key 11 are retracted, as the nose key moves axially away from the core into the tubular body of the mandrel it takes with it the segments 4 and 5. With the segments 4 and 5 and the nose key 11 removed, the top and bottom segments 6 and 7 can then be moved together in the retracted position by moving the plates 13, 14 mounted on the member 12 together. The socket or end of the pipe is now completely free of the mold and can also be moved from between the support members 52 and then by releasing the compression member 21 the pipe can be removed from the holding member 23. The movements of the various members, i.e., the mandrel 3, the cheeks 1 forming the outer member of the mold and the transport 23 for moving the pipe are all automatically controlled.

In the molding method and apparatus just described, the pipe is inserted axially into the space between the core and the outer member of the mold so that the axial pressure provided for forming the socket also increases the wall thickness of the pipe, in the socket. In the prior art the walls are forced radially outward which has the tendency of reducing the thickness of the walls. This invention has the dual advantage of forming the socket and simultaneously increasing the wall thickness of the pipe and avoiding any loss of strength in the pipe at the socket.

While specific embodiments of the invention have been shown and described in detail to illustrate the application of the inventive principles, it will be understood that the invention may be embodied otherwise without departing from such principles.

What is claimed is:

1. An apparatus for forming an expanded socket-shaped end on a section of plastic pipe where the socket-shaped end has an increased wall thickness compared with the wall thickness of the remainder of the pipe section and for forming an annular groove in the interior of the socket-shaped end extending concentrically about the axis of the plastic pipe section so that the properly shaped end of another plastic pipe section can be secured within the socket-shaped end, comprising a cylindrically shaped hollow outer mold section, said outer mold section formed of a pair of similarly-shaped semi-cylindrical cheek members, means for moving said cheek members between an assembled molding position and a disassembled position so that said cheek members are moved perpendicularly to the axis of said outer mold section from the assembled molding position away from one another into the disassembled position, said means for moving said cheek members comprising a separate cylinder attached to each said cheek member for moving said cheek members in a radial direction in relation to the axis of said outer mold section in the assembled molding position, each of said cheek members having a recess formed in the interior surface thereof providing a continuous annular-shaped groove within said outer mold section when said cheek members are disposed in the assembled position, a cylindrically-shaped core mold section composed of a pair of oppositely disposed first segments and a pair of oppositely disposed second segments, said first and second segments being movable between an assembled molding position and a disassembled position, in the assembled position the exterior surfaces of said first and second segments are arranged in an alternating manner forming a continuous surface spaced inwardly from the interior surface of said cheek members in the assembled position and forming therebetween an axially extending annular molding space, the exterior surfaces of said first and second segments each having a protuberance thereon forming a continuous annular protuberance around said core mold section in the assembled position which is disposed opposite and radially inwardly from the annular groove in said outer mold section in the assembled position, means for moving said first segments of said core mold section between the assembled molding position and the disassembled position comprising a separate plate member attached to each of said first segments, and a support member movably supporting each of said plates so that said plates can be moved away from one another in a radial direction relative to the central axis of said core mold section for placing said first segments in the assembled position and toward one another for placing said first segments in the disassembled position, means arranged for moving said second segments between the assembled position and the disassembled position comprising a mandrel rotated on and movable in the axial direction of said core mold section, said mandrel comprising a hollow tubular member, a tapered nose key axially positioned within said mandrel, means for displacing said nose key within said mandrel between a retracted position and an extended position, said second segments being retractible into said mandrel in the disassembled position, and a pair of tapered surface on said nose key disposed in contact with said second segments in the assembled position for displacing said second segments into the assembled position when said means for displacing said nose key extends said nose key from the retracted into the extended position, and means for supporting and pressing a plastic pipe section having a thickness less than the radial dimension of the annular molding space between said outer mold and said core mold section into the molding space for forming a socket-shaped end on the plastic pipe section having an increased thickness as compared to the normal thickness of the pipe.

2. An apparatus as set forth in claim 1 wherein heating and cooling means are disposed in said cheek members for heating and cooling the end of a tubular member inserted into said mold.

3. An apparatus as set forth in claim 1 wherein a traveling holding member is positioned to hold a section of tubular member and move it in axial alignment with said mold, and pressure means associated with said holding member and adapted to force the section of pipe secured by the holding member into the space formed between said core and outer member of said mold.

References Cited

UNITED STATES PATENTS

| | | | |
|---|---|---|---|
| 1,698,999 | 1/1929 | Hothersoll | 18—19TUX |
| 3,248,756 | 3/1966 | Mills et al. | 18—19E |
| 3,360,826 | 1/1968 | Lorang | 18—19E |
| 2,396,635 | 3/1946 | Bogoslowsky | 264—CT Dig. |
| 2,801,444 | 8/1957 | Lorenian | 264—CT Dig. |
| 2,900,665 | 8/1959 | Walker | 264—CT Dig. |

WILLIAM S. LAWSON, Primary Examiner